United States Patent
Kwon et al.

(10) Patent No.: US 10,574,967 B2
(45) Date of Patent: Feb. 25, 2020

(54) AUTONOMOUS PERFORMANCE OF AN OPERATION ON AN OBJECT USING A GENERATED DENSE 3D MODEL OF THE OBJECT

(71) Applicant: The Boeing Company, Chicago, IL (US)

(72) Inventors: Hyukseong Kwon, Thousand Oaks, CA (US); Kyungnam Kim, Oak Park, CA (US); Heiko Hoffmann, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 15/467,615

(22) Filed: Mar. 23, 2017

(65) Prior Publication Data
US 2018/0276793 A1    Sep. 27, 2018

(51) Int. Cl.
*H04N 13/00*    (2018.01)
*H04N 13/204*    (2018.01)
(Continued)

(52) U.S. Cl.
CPC .......... *H04N 13/204* (2018.05); *G06T 7/579* (2017.01); *G06T 17/00* (2013.01); *H04N 13/122* (2018.05); *H04N 13/156* (2018.05); *H04N 13/221* (2018.05); *G06T 2200/04* (2013.01); *G06T 2207/10016* (2013.01); *G06T 2207/10028* (2013.01); *H04N 2013/0081* (2013.01)

(58) Field of Classification Search
CPC .......... G06T 17/00; G06T 2207/10028; G06T 7/0002; H04N 13/156; H04N 13/204
See application file for complete search history.

(56) References Cited

U.S. PATENT DOCUMENTS 8,958,654 B1 * 2/2015 Evans ...................... G06T 5/20
356/5.01
9,486,918 B1    11/2016 Earl et al.
(Continued)

OTHER PUBLICATIONS

Bradley Skinner,(3D Point Cloud Upsampling for Accurate Reconstruction of Dense 2.50 Thickness Maps (Year: 2014).*
(Continued)

*Primary Examiner* — Md N Haque
(74) *Attorney, Agent, or Firm* — Sage Patent Group

(57) ABSTRACT

A method for performing an operation on an object includes capturing a plurality of images of the object. Each image is a different view of the object. The method also includes generating a sparse 3D point cloud from the plurality of images. The sparse 3D point cloud defines a 3D model of the object. The sparse 3D point cloud includes a multiplicity of missing points that each correspond to a hole in the 3D model that renders the 3D model unusable for performing the operation on the object. The method additionally includes performing curvature-based upsampling to generate a denser 3D point cloud. The denser 3D point cloud includes a plurality of filled missing points. The missing points are filled from performance of the curvature-based upsampling. The denser 3D point cloud defines a dense 3D model that is useable for performing the operation on the object.

20 Claims, 6 Drawing Sheets

(51) Int. Cl.
*G06T 17/00* (2006.01)
*H04N 13/156* (2018.01)
*H04N 13/122* (2018.01)
*G06T 7/579* (2017.01)
*H04N 13/221* (2018.01)

(56) References Cited

U.S. PATENT DOCUMENTS

| | | | | |
|---|---|---|---|---|
| 9,530,218 | B2 | 12/2016 | Mundhenk et al. | |
| 10,210,669 | B1* | 2/2019 | Cox | G06T 19/20 |
| 2011/0181589 | A1* | 7/2011 | Quan | G06T 17/05 |
| | | | | 345/420 |
| 2013/0259360 | A1* | 10/2013 | Bingrong | G06T 7/593 |
| | | | | 382/154 |
| 2015/0287211 | A1* | 10/2015 | Mundhenk | G06T 7/143 |
| | | | | 382/173 |
| 2016/0012646 | A1* | 1/2016 | Huang | G06T 5/005 |
| | | | | 345/419 |

OTHER PUBLICATIONS

Jaesik Park, High-Quality Depth Map Upsampling and Completion for RGB-D Cameras (Year: 2014).*
VisualSFM; "VisualSFM: A Visual Structure from Motion System," Downloaded from the Internet on Jan. 31, 2017, 3 Pages, <http://ccwu.me/vsfm/>.
Wang, Ruisheng, et al.; "A New Upsampling Method for Moblie LiDar Data," IEEE Workshops on Applications of Computer Vision, 2012, pp. 17-24.
Park, Jaesik, et al.; "High-Quality Depth Map Upsampling and Completion for RGB-D Cameras," IEEE Transactions on Image Processing, 2014, pp. 5559-5572, vol. 23.
Wong, Uland, et al.; "Camera and LIDAR Fusion for Mapping of Actively Illuminated Subterranean Voids," Field and Service Robotics, Springer, 2009, pp. 421-430, vol. 23.
Mundhenk, T. Nathan, et al.; "Frame Rate Fusion and Upsampling of EO/LIDAR Data for Multiple Platforms," IEEE International Conference on Computer Vision and Pattern Recognition, 2014, pp. 748-755.
Skinner Bradley, et al.; "3D Point Cloud Upsampling for Accurate Reconstruction of Dense 2.5D Thickness Maps," Proceedings of Australasian Conference on Robotics and Automation, 2014, 8 Pages.
Zhao, Wei, et al.; "A robust hole-filling algorithm for triangular mesh," Visual Comput, 2007, 11 Pages.
Davis, James, et al.; "Filling Holes in Complex Surfaces using Volumetric Diffusion," Proc. First International Symposium on 3D Data Processing, Visualization, Transmission, 2002, 11 Pages.
Sagawa, Ryusuke, et al.; "Hole Filling of a 3D Model by Flipping Signs of a Signed Distance Field in Adaptive Resolution," IEEE Transactions on Pattern Analysis and Machine Intelligence, 2008, pp. 686-699, vol. 30.
Wang, Jianning, et al.; "A Hole-Filling Strategy for Reconstruction of Smooth Surfaces in Range Images," Proc. of Brazilian Symposium on Computer Graphics and Image Processing, 2003, 8 Pages.
Rusinkiewicz, Szymon, et al.; "Efficient Variants of the ICP Algorithm," 3-D Digital Imaging and Modeling, 2001, 8 Pages.
Wu, Changchang; "Towards Linear-time Incremental Structure from Motion," Visual SFM, Date Not Known, Downloaded from the Internet, 8 Pages, <http://ccwu.me/vsfm/vsfm.pdf>.
Schonberger, Johannes L., et al.; "Structure-from-Motion Revisited," IEEE Conference on Computer Vision and Pattern Recognition (CVPR), 2016, pp. 4104-4113.
Sahbani, A., et al.; "An overview of 3D object grasp synthesis algorithms," Robotics and Autonomous Systems, 2011, 11 Pages.
Jasiobedzki, Piotr, et al.; "Autonomous Satellite Rendezvous and Docketing Using LIDAR and Model Based Vision," Proc. of SPIE, 2005, pp. 54-65, vol. 5798.
Abraham, Mark, et al.; "Robust 3D Vision for Autonomous Space Robotic Operations," Proceedings of the 6th International Symposium on Artificial Intelligence and Robotics & Automation in Space: i-SAIRAS, 2001, 8 Pages.
Wang, B., et al.; "Grasping Unknown Objects Based on 3D Model Reconstruction," IEEE International Conference on Advanced Intelligent Mechatronics, 2005, pp. 461-466.

* cited by examiner

AUTONOMOUS PERFORMANCE OF AN OPERATION ON AN OBJECT USING A GENERATED DENSE 3D MODEL OF THE OBJECT

FIELD

The present disclosure relates to autonomous performance of operations on objects by robots or other devices, and more particularly to autonomous performance of an operation on an object using a generated dense 3D model of the object.

BACKGROUND

A three-dimensional (3D) model may be developed from multiple images of an object taken from different viewpoints relative to the object. Visual Structure from Motion (VisualSfM) is an example of one method for producing 3D models from multiple images of an object taken from different viewpoints relative to the object. The 3D model may be used in performing an autonomous operation on the object, for instance, by a robot or other device. However, Visual SfM often suffers from insufficient features on objects or feature detection discrepancy among images because of illumination changes. Such conditions may be particularly present with objects, such as satellites or other spacecraft, in space where illumination levels of the object may vary widely from one viewpoint to another. This results in incomplete 3D models with holes or missing information or data on surfaces. Accordingly, there is a need to fill-in as many holes as possible and generate a denser 3D model.

SUMMARY

In accordance with an embodiment, a method for performing an operation on an object using a generated dense three-dimensional (3D) model of the object includes capturing a plurality of images of the object. Each image is a different view of the object. The method also includes generating a sparse 3D point cloud from the plurality of images, wherein the sparse 3D point cloud defines a 3D model of the object. The sparse 3D point cloud includes a multiplicity of missing points that each correspond to a hole in the 3D model that renders the 3D model defined by the sparse 3D point cloud unusable for performing the operation on the object. The method further includes performing curvature-based upsampling to generate a denser 3D point cloud than the sparse 3D point cloud. The denser 3D point cloud includes a plurality of filled missing points. The missing points are filled from performance of the curvature-based upsampling. The denser 3D point cloud defines a dense 3D model that is useable for performing the operation on the object.

In accordance with another embodiment, a system for performing an operation on an object using a generated dense three-dimensional (3D) model of the object includes a processor and a memory. A module for generating a dense three-dimensional (3D) model of the object is stored in the memory. When executed by the processor, the module causes the processor to perform a set of functions including capturing a plurality of images of the object, each image being a different view of the object. The set of functions also includes generating a sparse 3D point cloud from the plurality of images. The sparse 3D point cloud defines a 3D model of the object. The sparse 3D point cloud includes a multiplicity of missing points that each correspond to a hole in the 3D model that renders the 3D model defined by the sparse 3D point cloud unusable for performing the operation on the object. The set of functions also includes performing curvature-based upsampling to generate a denser 3D point cloud than the sparse 3D point cloud. The denser 3D point cloud includes a plurality of filled missing points. The missing points are filled from performance of the curvature-based upsampling. The denser 3D point cloud defines a dense 3D model that is useable for performing the operation on the object.

In accordance with a further embodiment, a computer program product for performing an operation on an object using a generated dense three-dimensional (3D) model of the object includes a computer readable storage medium having program instructions embodied therewith. The computer readable storage medium is not a transitory medium per se. The program instructions are executable by a device to cause the device to perform a method including capturing a plurality of images of the object. Each image is a different view of the object. The method also includes generating a sparse 3D point cloud from the plurality of images. The sparse 3D point cloud defines a 3D model of the object. The sparse 3D point cloud includes a multiplicity of missing points that each correspond to a hole in the 3D model that renders the 3D model defined by the sparse 3D point cloud unusable for performing the operation on the object. The method additionally includes performing curvature-based upsampling to generate a denser 3D point cloud than the sparse 3D point cloud. The denser 3D point cloud includes a plurality of filled missing points. The missing points are filled from performance of the curvature-based upsampling. The denser 3D point cloud defines a dense 3D model that is useable for performing the operation on the object.

In accordance with another embodiment or any of the previous embodiments, capturing the plurality of images of the object includes capturing a plurality of electro-optic images of the object using an electro-optic camera and storing the plurality of electro-optic images in a storage device.

In accordance with another embodiment or any of the previous embodiments, capturing the plurality of electro-optic images includes moving a single camera to different viewpoints about the object to capture the plurality of electro-optic images, or capturing the plurality of electro-optic images includes using a plurality of cameras positioned at different viewpoints about the object to capture the plurality of electro-optic images.

In accordance with another embodiment or any of the previous embodiments, the method further includes determining a set of camera parameters associated with the plurality of images used to generate the sparse 3D point cloud.

In accordance with another embodiment or any of the previous embodiments, performing curvature-based upsampling to generate the denser 3D point cloud includes respectively projecting an image from the sparse 3D point cloud onto each image of the plurality of images of the object and respectively overlapping each image and the image from the sparse 3D point cloud. Performing curvature-based upsampling also includes estimating a plurality of neighborhood curvatures for any missing points on the projected image from the sparse 3D point cloud that exist on a particular overlapping image of the plurality of images of the object using the set of camera parameters. Performing curvature-based upsampling additionally includes estimating a 3D location of a particular missing point in the sparse 3D point cloud using the plurality of neighborhood curvatures for the particular missing point.

In accordance with another embodiment or any of the previous embodiments, the method also includes populating an upsampled image in a 3D space with the 3D location of the particular missing points that exist on each image of the plurality of images of the object. The upsampled image in the 3D space defines the denser 3D point cloud.

In accordance with another embodiment or any of the previous embodiments, estimating the 3D location of the particular missing point in the sparse 3D point cloud includes selecting a pixel and a search window containing the pixel in a current image overlapping an image from the sparse 3D point cloud. The pixel corresponds to the particular missing point in the sparse 3D point cloud. Estimating the 3D location of the particular missing point in the sparse 3D point cloud also includes estimating a group of available directions to check in the search window relative to the selected pixel. Estimating the 3D location of the particular missing point in the sparse 3D point cloud also includes determining a slope of curvature from multiple points in each available direction in the search window on the current image overlapping an image from the sparse 3D point cloud. Estimating the 3D location of the particular missing point in the sparse 3D point cloud additionally includes estimating a final position of an upsampled point by determining a median value of the slope of curvature from the multiple points in each available direction. Estimating the 3D location of the particular missing point in the sparse 3D point cloud further includes adding the upsampled point for the missing point in the sparse 3D point cloud to generate the denser 3D point cloud, the upsampled point comprising 3D position information.

In accordance with another embodiment or any of the previous embodiments, performing curvature-based upsampling includes determining a 3D location of a missing point in the sparse 3D point cloud using a corresponding feature visible in at least one of the plurality of images of the object. Performing curvature-based upsampling also includes filling the missing point in the sparse 3D point cloud by using projective geometry and a relationship between the feature visible in the at least one of the plurality of images and a location and orientation of a camera that captured the at least one image.

In accordance with another embodiment or any of the previous embodiments, filling the missing points or upsampling the missing points in the sparse 3D point cloud includes identifying at least two contiguous regions within the images that have a constant or at least continuous color and intensity.

In accordance with another embodiment or any of the previous embodiments, the filling the plurality of missing points or upsampling the missing points includes synthesizing a 3D surface from a multiplicity of 3D points within the contiguous regions by polynomial curve fitting; synthesizing a first set of 3D points within missing points within the synthesized 3D surface by interpolation within the synthesized 3D surface; synthesizing a second set of 3D points within missing points adjacent the synthesized 3D surface by extrapolation from the synthesized 3D surface; and updating pixels within the sparse 3D point cloud corresponding to the first and second set of 3D points to generate the denser 3D point cloud.

The features, functions, and advantages that have been discussed can be achieved independently in various embodiments or may be combined in yet other embodiments further details of which can be seen with reference to the following description and drawings.

DETAILED DESCRIPTION

Figure 1:
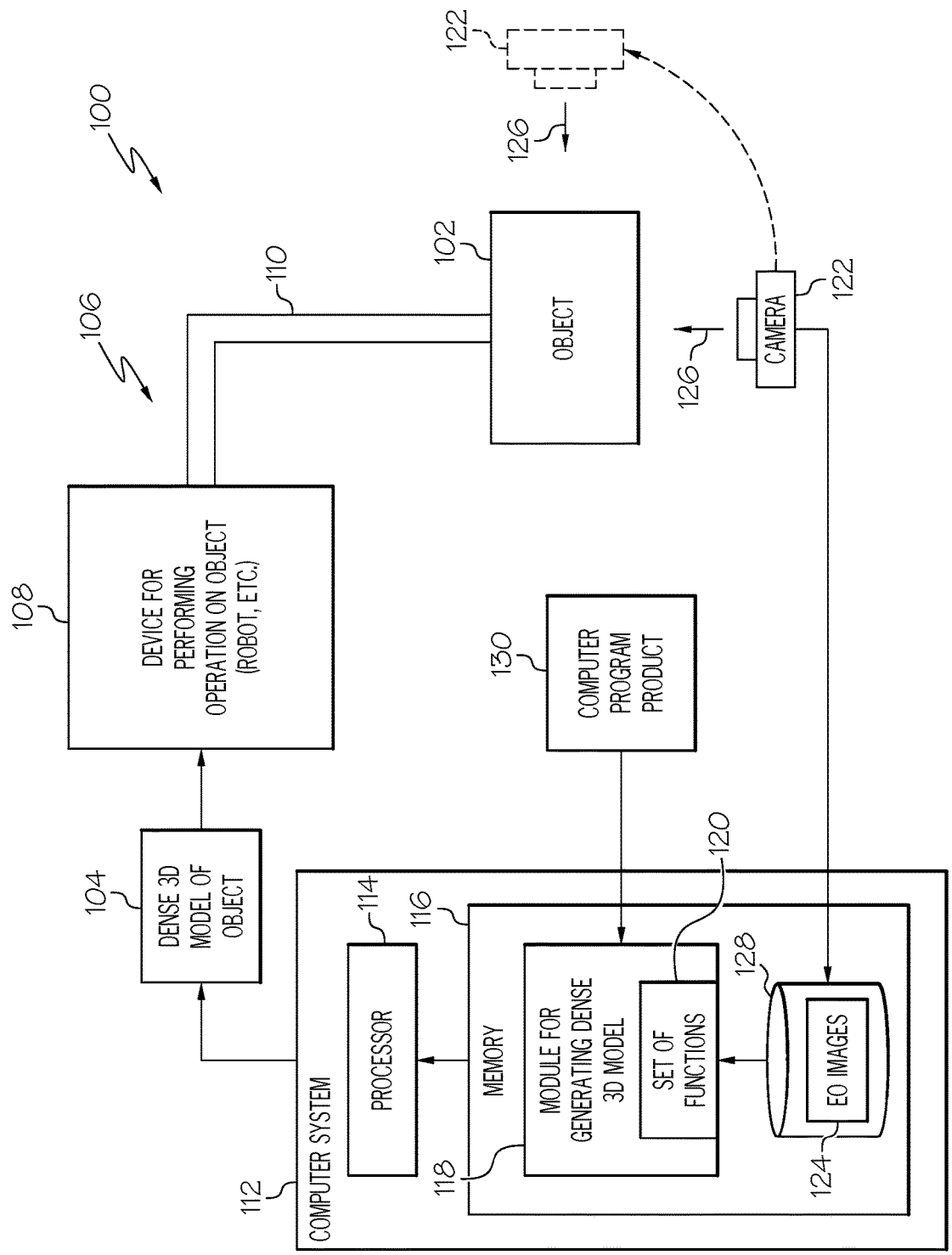
FIG. 1 is a block schematic diagram of an example of a system for performing an operation on an object using a generated dense 3D model of the object in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a block schematic diagram of an example of a system 100 for performing an operation on an object 102 using a generated dense three-dimensional (3D) model 104 of the object 102 in accordance with an embodiment of the present disclosure. The system 100 includes a device 106 for performing an operation on the object 102 using the dense 3D model 104 of the object 102. In accordance with an embodiment, the device 106 is a robot 108 for moving the object 102 or for performing some function associated with the object 102. In accordance with an example, the device 106 or robot 108 includes a multi-degree of freedom anthropomorphic robotic arm 110. In accordance with a further embodiment, the device 106 is a mobile device, such as an aircraft, watercraft, spacecraft or other vehicle equipped with a multi-degree of freedom anthropomorphic arm 110 or arms.

In accordance with an embodiment, the system 100 also includes a computer system 112. In accordance with an example, the computer system 112 is part of the device 106 or robot 108. In other exemplary embodiments, the computer system 112 is a separate component from the device 106 or robot 108 similar to the exemplary embodiment illustrated in FIG. 1.

The computer system 112 includes a processor 114 and a memory 116. A module 118 for generating the dense 3D model 104 of the object 102 is stored in the memory 116. When the module 118 is executed by the processor 114, the module 118 causes the processor 114 to perform a set of functions 120 as described herein.

The system 100 also includes at least one camera 122 or sensor for capturing a plurality of images 124 of different views of the object 102. In accordance with an embodiment, a single camera 122 is moved to different viewpoints 126 about the object 102 to capture the plurality of images 124. In accordance with another embodiment, a plurality of cameras 122 are positioned at different viewpoints 126 about the object 102 to capture the plurality of images 124 of the object 102. In accordance with an example, the camera 122 or cameras are electro-optic cameras or sensors and capture electro-optic images 124 of the object 102. In accordance with an embodiment, the camera or electro-optical camera is a digital camera or digital cameras. The electro-optic images 124 or digital images are stored on a storage device 128 which, in accordance with an embodiment, is a component of the memory 116 of the computer system 112.

In accordance with an embodiment, the module 118 for generating the dense 3D model is stored on a computer program product 130. The module 118 for generating the dense 3D model may be downloaded to the memory 116 from the computer program product 130. The computer program product 130 is similar to one of the examples previously described.

Figure 2:
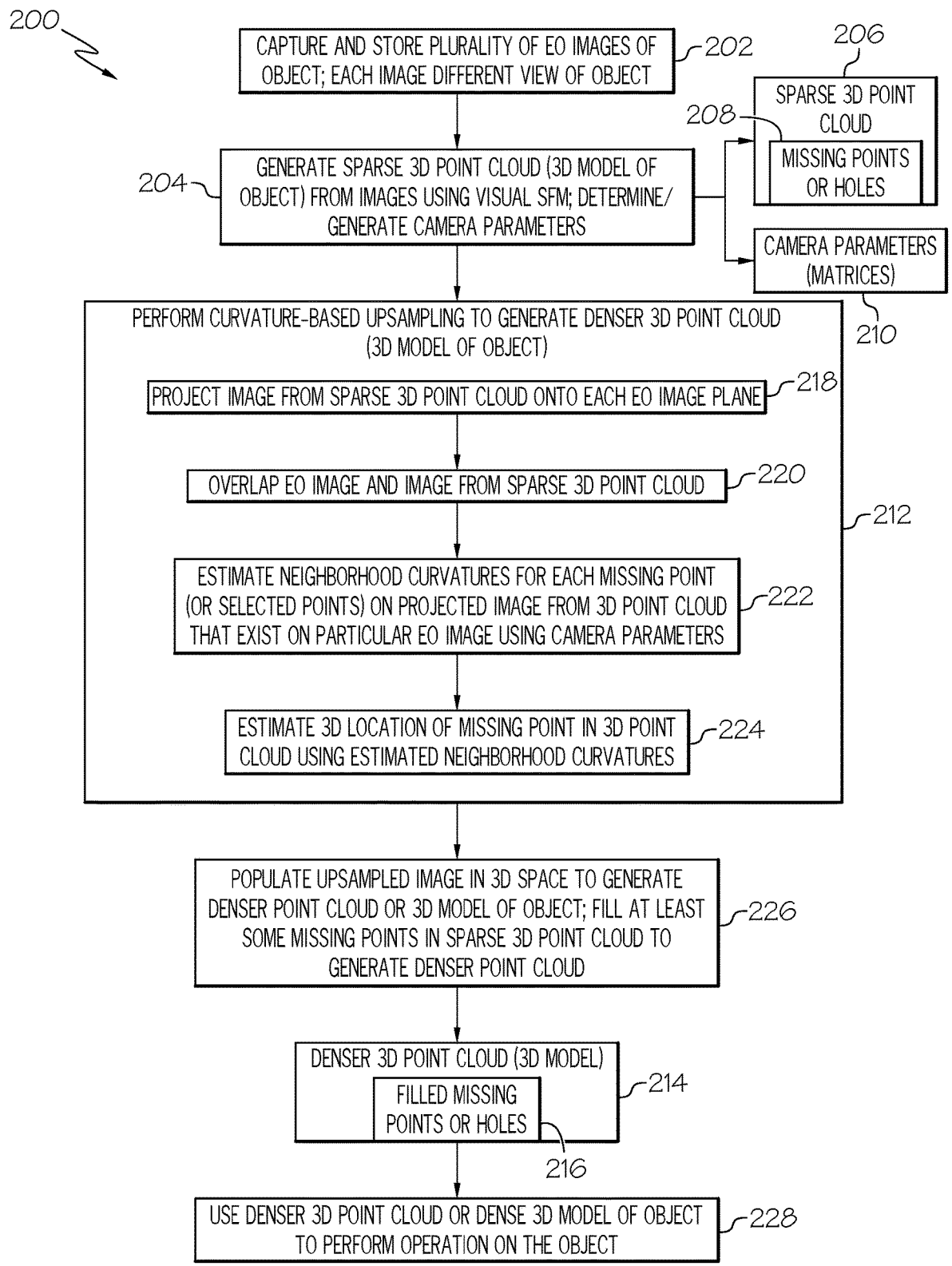
FIG. 2 is a flow chart of an example of a method for generating a dense 3D model of an object for performing an operation on the object in accordance with an embodiment of the present disclosure.

FIG. 2 is a flow chart of an example of a method 200 for generating a dense 3D model of an object for performing an operation on the object in accordance with an embodiment of the present disclosure. In accordance with an example, the method 200 is embodied in and performed by the module 118 in FIG. 1. In block 202, a plurality of images of the object 102 are captured. Each captured image is a different view of the object 102. In accordance with an embodiment, a plurality of electro-optic (EO) images 124 of the object 102 are captured using an electro-optic camera 122 or sensor. As previously described, in accordance with one example, the plurality of images 124 are captured by moving a single camera 122 to different viewpoints 126 about the object 102 to capture the plurality of images 124. In accordance with another embodiment, the plurality of images 124 are captured by using a plurality of cameras 122 positioned at different viewpoints 126 about the object 102 to capture the plurality of images 124 124. The images 124 are saved or stored in a storage device 128 or database.

Figure 3:
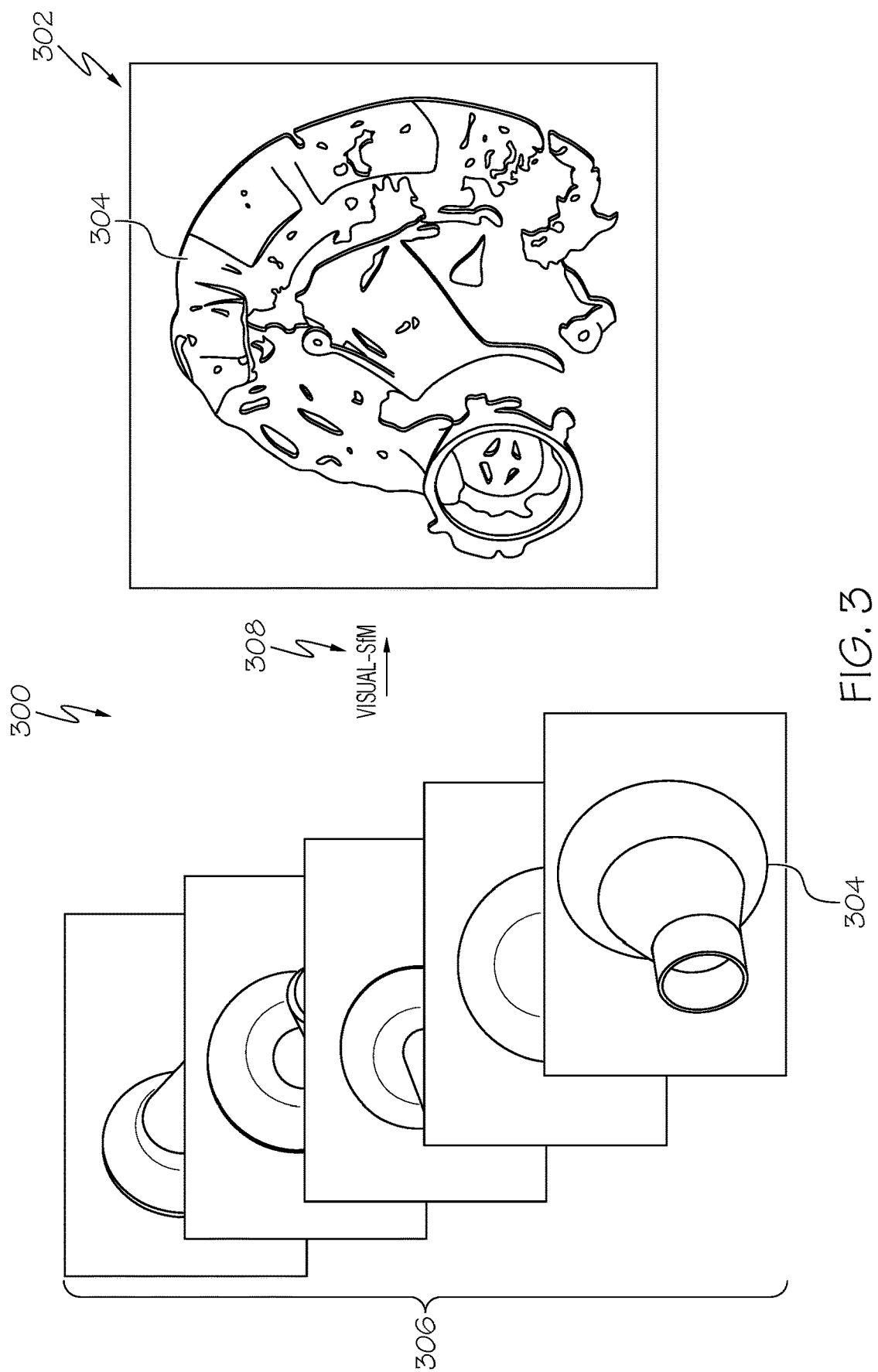
FIG. 3 is an illustration of an example of generating a 3D point cloud of an object using visual SfM in accordance with an embodiment of the present disclosure.

In block 204, a sparse 3D point cloud 206 is generated from the plurality of images 124. Referring also to FIG. 3, FIG. 3 is an illustration of an example 300 of generating a 3D point cloud 302 of an object 304 from a plurality of images 306 of the object 304. Each image 306 of the object 304 is taken or captured from a different viewpoint of the object 304 similar to that previously described. In accordance with an embodiment, the sparse 3D point cloud 302 of the object 304 is generated from the plurality of images 306 using Visual Structure from Motion (Visual-SfM) 308 or other 3D reconstruction algorithm or application. One example of a structure from motion algorithm is described in "Structure-from-Motion Revisited," by J. L. Schönberger and J. M. Frahm, 2016 *IEEE Conference on Computer Vision and Pattern Recognition (CVPR)*, Las Vegas, N V, 2016, pp. 4104-4113.

The sparse 3D point cloud 206 defines a 3D model of the object 102. The sparse 3D point cloud 206 is characterized by having a multiplicity of missing points 208 that each correspond to a hole in the 3D model that renders the 3D model defined by the sparse 3D point cloud 206 unusable for performing the operation on the object 102.

Also in block 204, a set of camera parameters 210 or camera matrices associated with each of the plurality of images 306 that are used to generate the sparse 3D point cloud 302 are generated or determined. Camera parameters 210 for each image 306 include focal lengths—$f_x$ (f subscript x), $f_y$ (f subscript y); principal points—$c_x$ (c subscript x), $c_y$ (c subscript y), rotation matrix—R; and translation vector—T with missing scaling factor. From the camera parameters 210, the camera intrinsic calibration matrix is equation 1:

$$K = \begin{bmatrix} f_x & 1 & c_x \\ 0 & f_y & c_y \\ 0 & 0 & 1 \end{bmatrix} \quad \text{Eq. 1}$$

In block 212, curvature-based upsampling may be performed to generate a denser 3D point cloud 214 than the sparse 3D point cloud 206. The denser 3D point cloud 214 includes a plurality of filled missing points 216 or upsampled missing points 216. The missing (upsampled) points 216 are filled by performance of the curvature-based upsampling 212. The denser 3D point cloud 214 defines a dense 3D model 104 that is useable for performing the operation on the object 102. The dense 3D model 104 of the object 102 includes filled holes corresponding to the upsampled missing points 216 in the denser 3D point cloud 214.

In accordance with an exemplary embodiment the curvature-based upsampling will be described with reference to blocks 218-224 in FIG. 2. In accordance with another exemplary embodiment, the curvature-based upsampling will be described with reference to the exemplary method 400 in FIG. 4 and a further exemplary embodiment of the curvature-based upsampling will be described with respect to the exemplary method 600 in FIG. 6.

In block 218, an image from the sparse 3D point cloud 206, 302 is projected onto each image 306 or image plane. The image from the sparse 3D point cloud 206, 302 is respectively projected onto each image 306 of the plurality of images of the object 102, 304. By using the camera parameters 210, the image from the sparse 3D point cloud 206, 302 is projected onto each respective image 306 of the object 102, 304. During the projection procedure, each projected point in the image plane also contains 3D location information for the later upsampling step or operation. A projected point onto the image, p=(x, y) is estimated from the 3D point location, P=(X, Y, Z), as Equation 2:

$$\begin{bmatrix} x_i \\ y_i \\ z_i \end{bmatrix} = KR \begin{bmatrix} x \\ y \\ z \end{bmatrix} + KT \quad \text{Eq. 2}$$

$$\begin{bmatrix} x \\ y \end{bmatrix} = \begin{bmatrix} x_i/z_i \\ y_i/z_i \end{bmatrix} \quad \text{Eq. 3}$$

This procedure results in a projected image from the sparse 3D point cloud 206, 302. When multiple 3D points are co-located on the image plane, the 3D information or location information is taken from the closest point. A depth from the camera 122 to each point, $P_k$ (P subscript k) is obtained through equation 4:

$$dk = \|P_k - (-(KR))^{-1}KT\| \quad \text{Eq. 4}$$

In block 220, each image 124, 306 of the plurality of images is respectively overlapped with the image from the sparse 3D point cloud 302. In block 222, a plurality of neighborhood curvatures are estimated for any missing points 208 on the projected image from the sparse 3D point cloud 206, 302 that exist on a particular overlapping image of the plurality of images 124, 306 of the object 102 using the set of camera parameters 210.

In block 224, a 3D location or location information of a particular missing point 208 in the sparse 3D point cloud 206 is estimated using the plurality of neighborhood curvatures for the particular missing point 208.

In block 226, an upsampled image in a 3D space is populated with the 3D location or location information of the missing points 208 that exist on each image of the plurality of images 124, 306 of the object 102, 304. The upsampled image in the 3D space defines the denser 3D point cloud 214. The denser 3D point cloud 214 defines the dense 3D model of the object 102, 304 that is useable for performing the operation on the object 102 by the device 106.

In block 228, the denser 3D point cloud 214 or dense 3D model 104 of the object 102, 304 is used to perform the operation on the object 102, 304 by the device 106.

Figure 4:
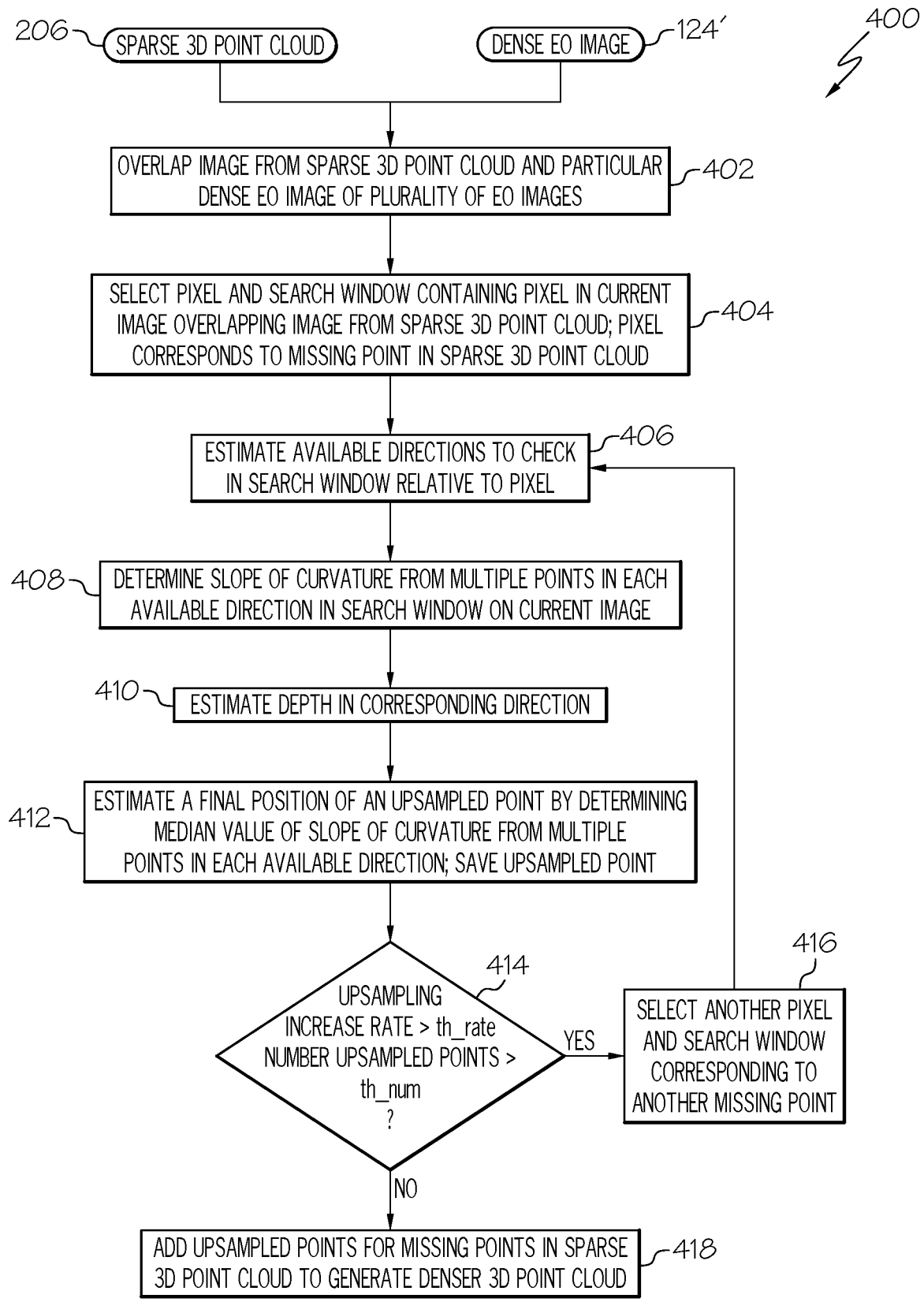
FIG. 4 is a flow chart of an example of a method for performing curvature-based upsampling to generate a denser 3D point cloud in accordance with an embodiment of the present disclosure.

FIG. 4 is a flow chart of an example of a method 400 for performing curvature-based upsampling to generate a denser 3D point cloud or dense 3D model of an object in accordance with an embodiment of the present disclosure. In accordance with an exemplary embodiment, the method 400 is part of block 212 in FIG. 2 and is embodied in and performed by the module 118 for generating a dense 3D model of the object 102 when executed by the processor 114.

In block 402, an image from the sparse 3D point cloud 206 and a particular dense EO image 124' of the plurality of images 124 are overlapped. Similar to that previously described, the image from the sparse 3D point cloud 206 is respectively projected onto each dense EO image 124'.

Figure 5:
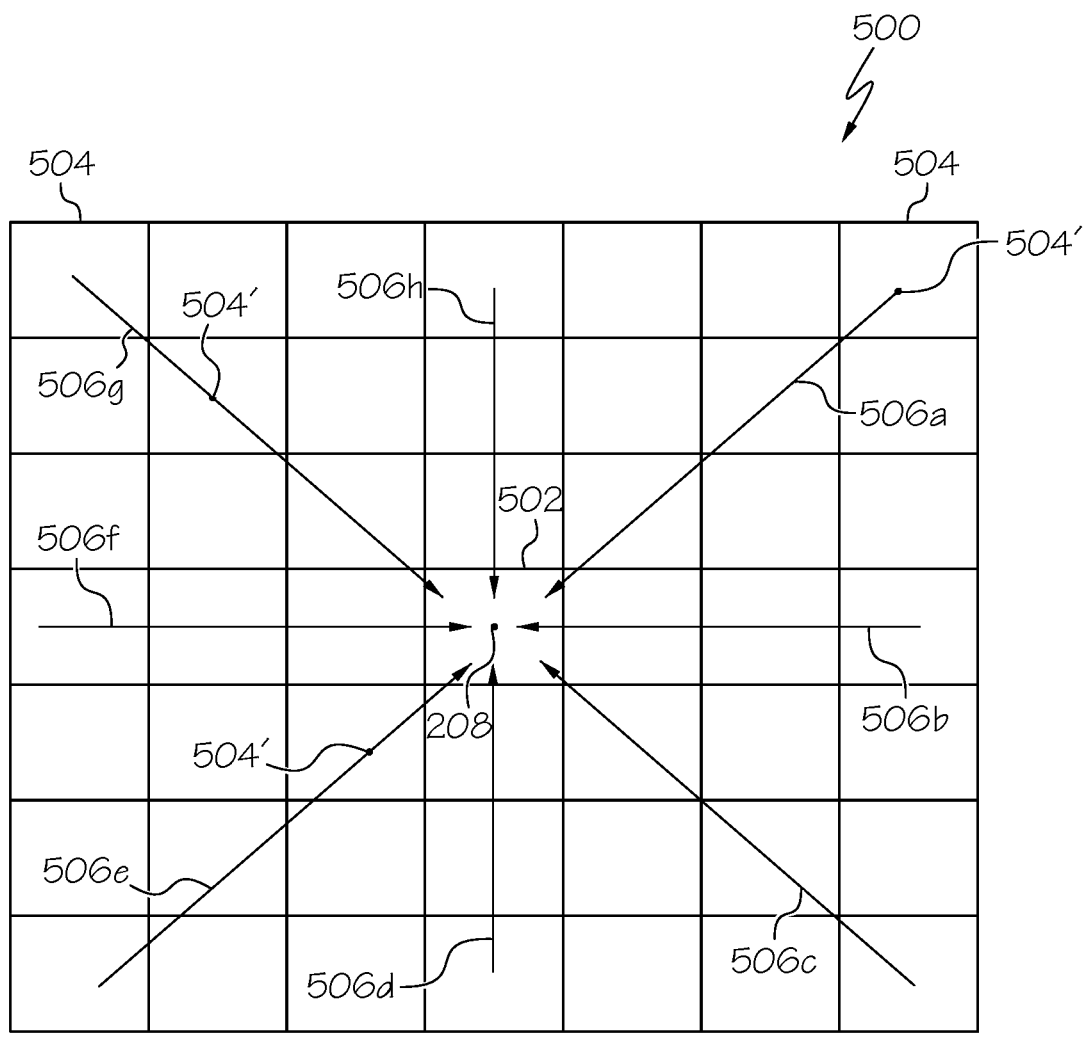
FIG. 5 is an illustration of an example of a search window for performing curvature-based upsampling to generate a denser 3D point cloud in accordance with an embodiment of the present disclosure.

In block 404, a pixel and a search window containing the pixel are selected in a current image 124 overlapping the image from the sparse 3D point cloud. The pixel corresponds to a particular missing point 208 in the sparse 3D point cloud 206. Referring also to FIG. 5, FIG. 5 is an illustration of an example of a search window 500 for performing curvature-based upsampling to generate a denser 3D point cloud or dense 3D model of the object in accordance with an embodiment of the present disclosure. A pixel 502 contained within the search window 500 is selected that corresponds to a particular missing point 208 or hole in the sparse 3D point cloud 206 that will be filled or upsampled by the curvature-based upsampling process as described herein to generate the denser 3D point cloud 214 which corresponds to a dense 3D model 104 of the object 102 with a multiplicity of holes being filled by the process. For each point or missing point 208 that does not have 3D location information in the sparse 3D point cloud 206 (which means no projected point or a hole in the 3D point cloud or image), neighborhood pixels 504 or pixels within the search window 500 and surrounding or bordering the selected pixel 502 are evaluated as illustrated in FIG. 5. Neighborhood pixels 504 which satisfy the following two conditions within a certain search window 500 are evaluated: (1) contain 3D information of an associated projected point; and (2) exhibit similar EO characteristics, e.g., color differences, intensity, brightness, etc. The EO characteristics of the neighborhood pixels 504 are useable to determine a slope curvature associated with the neighborhood pixels 504 relative to the selected pixel 502. The 3D location of the selected pixel 502 (missing point 208 in the sparse 3D point cloud 206) is estimated or determined using the curvature of the neighborhood pixels 504.

In block 406, a group of available directions 506a-506h (represented by arrows in FIG. 5) relative to the selected pixel 502 are estimated or determined to check or evaluate in the search window 500 for determining or estimating a 3D location of selected pixel 502 and corresponding missing point 208 or hole.

In block 408, a slope of curvature is determined from multiple points 504' in each available direction 506a-506h in the search window 500 on the current image 124 overlapping the image from the sparse 3D point cloud 206. The multiple points 504' respectively correspond to neighborhood pixels 504 that satisfy the conditions described above. In accordance with an embodiment, for a robust determination or estimation of the 3D location of selected pixel 502 or missing point 208, a total of about eight directions from the selected pixel 502 or missing point 208 in the search window 500 are desirable for evaluating the slope curvature of the neighborhood pixels 504.

In block 410, a depth in each corresponding direction 506a-506h is estimated. The depth corresponds to a distance between the camera or sensor and the newly generated 3D point or upsampled point.

In block 412, a final position or 3D location of an upsampled point or missing point 208 corresponding to the selected pixel 502 is estimated or determined by determining a median value of the slope of curvature from the multiple points 504' in each available direction 506a-506h. The final position or 3D location information associated with the missing (upsampled) point 208 is saved for adding or upsampling to the sparse 3D point cloud 206 for generating the denser 3D point cloud 214 that corresponds to the dense 3D model 104 of the object 102 (FIG. 1).

In accordance with an embodiment, to acquire a valid 3D location, the following conditions are preferably satisfied: (1) for each direction 506 out of the eight directions 506a-506h in the search window 500, there are at least two directions with 3D information to calculate tangential information of the corresponding surface; (2) at least four directions are valid among the eight directions 506a-506h (more than or equal to about 50% of tangential information is available); (3) for each available direction 506a-506h, there are at least two 3D points to estimate the slope of the curvature. If there are more than two, the two closest 3D points to the missing point 208 are picked; (4) there will be a discrepancy among the estimated 3D points along all directions 506a-506h. That discrepancy will be resolved by calculating a median value of 4 to 8 estimated 3D points (a median value reduces influences from extreme outliers); (5) all EO pixels 504 of 3D points 504' participating in the upsampling procedure should have similar (within a certain threshold) EO characteristics with that of the missing (upsampled) point 208.

This procedure is iterated until the number of newly added upsampled points is smaller than a preset number threshold (th_num) or the ratio of the number of upsampled points in the current iteration over that in the previous iteration is lower than another preset rate threshold (th_rate). Accordingly, in block 414 a determination is made whether an upsampling rate or ratio of the number of upsampled points in the current iteration over that in previous iterations is greater than the preset rate threshold (th_rate) or whether the number of newly added upsampled points is greater than the preset number threshold (th_num). If either of the thresholds is exceeded in block 414, another pixel and search window corresponding to another missing point is selected in block 416 and the method 400 returns to block 406 for another iteration. The method 400 will continue similar to that previously described. If the upsampling rate or ratio is not greater than the preset rate threshold (th_rate) or the number of newly added upsampled points is not greater than the preset number threshold (th_num), the method 400 will advance to block 418.

In block 418, the filled missing points 208 corresponding to upsampled points are added or upsampled for the missing points 208 in the sparse 3D point cloud 206 to generate the denser 3D point cloud 214 which defines the dense 3D model 104 of the object 102.

Figure 6:
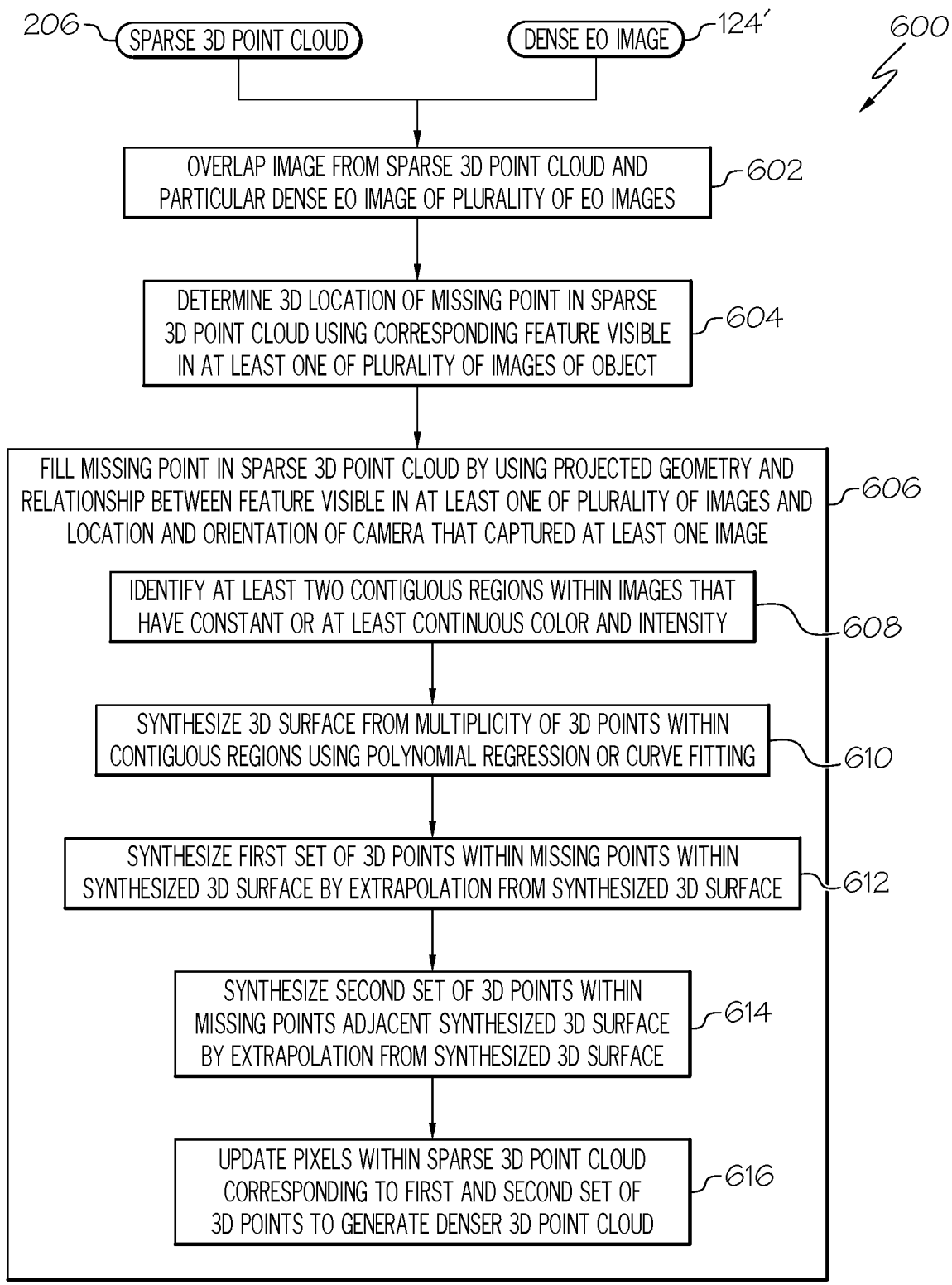
FIG. 6 is a flow chart of an example of a method for generating a denser 3D point cloud in accordance with another embodiment of the present disclosure.

FIG. 6 is a flow chart of an example of a method 600 for performing curvature-based upsampling to generate a denser 3D point cloud or dense 3D model of the object in accordance with another embodiment of the present disclosure. In accordance with an exemplary embodiment, the method 600 is part of block 212 in FIG. 2 and is embodied in and performed by the module 118 for generating a dense 3D model 104 of the object 102.

In block 602, an image from the sparse 3D point cloud 206 and a particular dense EO image 124' of the plurality of images 124 are overlapped. Similar to that previously described, the image from the sparse 3D point cloud 206 is respectively projected onto each respective dense EO image 124'.

In block 604, a 3D location of a missing point in the sparse 3D point cloud 206 is determined using a corresponding feature visible in at least one of the plurality of images 124 of the object 102. In block 606, the missing point in the sparse 3D point cloud 206 is filled by using projective geometry and a relationship between the feature visible in the at least one of the plurality of images 124 and a location and orientation of a camera 122 that captured the at least one image 124. In accordance with an embodiment, filling the missing points in the sparse 3D point cloud 206 includes iteratively performing the operations in blocks 608-616.

In block 608, filling the plurality of missing points in the sparse 3D point cloud 206 includes identifying at least two contiguous regions within the images 124 that have a constant or at least continuous color and intensity.

In block 610, a 3D surface is synthesized from a multiplicity of 3D points within the contiguous regions by polynomial curve fitting. In block 612, a first set of 3D points is synthesized within missing points within the synthesized 3D surface by interpolation within the synthesized 3D surface.

In block 614, a second set of 3D points is synthesized within missing points adjacent the synthesized 3D surface by extrapolation from the synthesized 3D surface. In block 616, pixels are updated within the sparse 3D point cloud 206 corresponding to the first and second set of 3D points to generate the denser 3D point cloud which defined the dense 3D model 104 of the object 102.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for performing an operation on an object using a generated dense three-dimensional (3D) model of the object, comprising:
   capturing a plurality of images of the object, each image being a different view of the object;
   generating a sparse 3D point cloud from the plurality of images, wherein the sparse 3D point cloud defines a 3D model of the object and the sparse 3D point cloud comprises a multiplicity of missing points that each correspond to a hole in the 3D model that renders the 3D model defined by the sparse 3D point cloud unusable for performing the operation on the object; and
   performing curvature-based upsampling to generate a denser 3D point cloud than the sparse 3D point cloud, the denser 3D point cloud comprising a plurality of filled missing points, the missing points being filled from performance of the curvature-based upsampling, the denser 3D point cloud defining a dense 3D model that is useable for performing the operation on the object, wherein performing curvature-based upsampling to generate the denser 3D point cloud comprises:
      respectively projecting an image from the sparse 3D point cloud onto each image of the plurality of images of the object;
      respectively overlapping each image and the projected image from the sparse 3D point cloud;
      estimating a plurality of neighborhood curvatures for any missing points on the projected image from the sparse 3D point cloud that exist on a particular overlapping image of the plurality of images of the object; and
      estimating a 3D location of a particular missing point in the sparse 3D point cloud using the plurality of neighborhood curvatures for the particular missing point.

2. The method of claim 1, wherein capturing the plurality of images of the object comprises:
   capturing a plurality of electro-optic images of the object using an electro-optic camera; and
   storing the plurality of electro-optic images in a storage device.

3. The method of claim 2, wherein capturing the plurality of electro-optic images comprises moving a single camera to different viewpoints about the object to capture the plurality of electro-optic images.

4. The method of claim 2, wherein capturing the plurality of electro-optic images comprises using a plurality of cameras positioned at different viewpoints about the object to capture the plurality of electro-optic images.

5. The method of claim 1, further comprising determining a set of camera parameters associated with the plurality of images used to generate the sparse 3D point cloud.

6. The method of claim 5, wherein
estimating the plurality of neighborhood curvatures for any missing points on the projected image from the sparse 3D point cloud that exist on the particular overlapping image of the plurality of images of the object comprises using the set of camera parameters.

7. The method of claim 1, further comprising populating an upsampled image in a 3D space with the 3D location of the particular missing point that exist on each image of the plurality of images of the object, the upsampled image in the 3D space defining the denser 3D point cloud.

8. The method of claim 1, wherein estimating the 3D location of the particular missing point in the sparse 3D point cloud comprises:
   selecting a pixel and a search window containing the pixel in a current image overlapping the image from the sparse 3D point cloud, wherein the pixel corresponds to the particular missing point in the sparse 3D point cloud;
   estimating a group of available directions to check in the search window relative to the selected pixel;
   determining a slope of curvature from multiple points in each available direction in the search window on the current image overlapping the image from the sparse 3D point cloud;
   estimating a final position of an upsampled point by determining a median value of the slope of curvature from the multiple points in each available direction; and
   adding the upsampled point for the missing point in the sparse 3D point cloud to generate the denser 3D point cloud, the upsampled point comprising 3D position information.

9. A system for performing an operation on an object using a generated dense three-dimensional (3D) model of the object, comprising:
   a processor;
   a memory;
   a module for generating a dense three-dimensional (3D) model of the object stored in the memory, when executed by the processor causes the processor to perform a set of functions comprising:
      capturing a plurality of images of the object, each image being a different view of the object;
      generating a sparse 3D point cloud from the plurality of images, wherein the sparse 3D point cloud defines a 3D model of the object and the sparse 3D point cloud comprises a multiplicity of missing points that each correspond to a hole in the 3D model that renders the 3D model defined by the sparse 3D point cloud unusable for performing the operation on the object; and
      performing curvature-based upsampling to generate a denser 3D point cloud than the sparse 3D point cloud, the denser 3D point cloud comprising a plurality of filled missing points, the missing points being filled from performance of the curvature-based upsampling, the denser 3D point cloud defining a dense 3D model that is useable for performing the operation on the object, wherein performing curvature-based upsampling to generate the denser 3D point cloud comprises:
         respectively projecting an image from the sparse 3D point cloud onto each image of the plurality of images of the object;
         respectively overlapping each image and the projected image from the sparse 3D point cloud;
         estimating a plurality of neighborhood curvatures for any missing points on the projected image from the sparse 3D point cloud that exist on a particular overlapping image of the plurality of images of the object; and
         estimating a 3D location of a particular missing point in the sparse 3D point cloud using the plurality of neighborhood curvatures for the particular missing point.

10. The system of claim 9, further comprising a device for performing an operation on the object using the dense 3D model.

11. The system of claim 9, further comprising at least one camera for capturing the plurality of images of the different views of the object.

12. The system of claim 9, wherein the set of functions further comprises determining a set of camera parameters associated with the plurality of images used to generate the sparse 3D point cloud.

13. The system of claim 12, wherein
estimating the plurality of neighborhood curvatures for any missing points on the projected image from the sparse 3D point cloud that exist on the particular overlapping image of the plurality of images of the object comprises using the set of camera parameters.

14. The system of claim 9, wherein the set of functions further comprises populating an upsampled image in a 3D space with the 3D location of the particular missing point that exist on each image of the plurality of images of the object, the upsampled image in the 3D space defining the denser 3D point cloud.

15. The system of claim 9, wherein estimating the 3D location of the particular missing point in the sparse 3D point cloud comprises:
   selecting a pixel and a search window containing the pixel in a current image overlapping the image from the sparse 3D point cloud, wherein the pixel corresponds to the particular missing point in the sparse 3D point cloud;
   estimating a group of available directions to check in the search window relative to the selected pixel;
   determining a slope of curvature from multiple points in each available direction in the search window on the current image overlapping the image from the sparse 3D point cloud;
   estimating a final position of an upsampled point by determining a median value of the slope of curvature from the multiple points in each available direction; and
   adding the upsampled point for the missing point in the sparse 3D point cloud to generate the denser 3D point cloud, the upsampled point comprising 3D position information.

16. A computer program product for performing an operation on an object using a generated dense three-dimensional (3D) model of the object, the computer program product comprising a computer readable storage medium having program instructions embodied therewith, wherein the computer readable storage medium is not a transitory medium per se, the program instructions being executable by a device to cause the device to perform a method comprising:
   capturing a plurality of images of the object, each image being a different view of the object;
   generating a sparse 3D point cloud from the plurality of images, wherein the sparse 3D point cloud defines a 3D model of the object and the sparse 3D point cloud comprises a multiplicity of missing points that each correspond to a hole in the 3D model that renders the 3D model defined by the sparse 3D point cloud unusable for performing the operation on the object; and performing curvature-based upsampling to generate a denser 3D point cloud than the sparse 3D point cloud, the denser 3D point cloud comprising a plurality of filled missing points, the missing points being filled from performance of the curvature-based upsampling, the denser 3D point cloud defining a dense 3D model that is useable for performing the operation on the object, wherein performing curvature-based upsampling to generate the denser 3D point cloud comprises:

respectively projecting an image from the sparse 3D point cloud onto each image of the plurality of images of the object;

respectively overlapping each image and the projected image from the sparse 3D point cloud;

estimating a plurality of neighborhood curvatures for any missing points on the projected image from the sparse 3D point cloud that exist on a particular overlapping image of the plurality of images of the object; and estimating a 3D location of a particular missing point in the sparse 3D point cloud using the plurality of neighborhood curvatures for the particular missing point.

17. The computer program product of claim 16, wherein estimating the plurality of neighborhood curvatures for any missing points on the projected image from the sparse 3D point cloud that exist on the particular overlapping image of the plurality of images of the object comprises using a set of camera parameters.

18. A method for performing an operation on an object using a generated dense three-dimensional (3D) model of the object, comprising:

capturing a plurality of images of the object, each image being a different view of the object;

generating a sparse 3D point cloud from the plurality of images, wherein the sparse 3D point cloud defines a 3D model of the object and the sparse 3D point cloud comprises a multiplicity of missing points that each correspond to a hole in the 3D model that renders the 3D model defined by the sparse 3D point cloud unusable for performing the operation on the object; and performing curvature-based upsampling to generate a denser 3D point cloud than the sparse 3D point cloud, the denser 3D point cloud comprising a plurality of filled missing points, the missing points being filled from performance of the curvature-based upsampling, the denser 3D point cloud defining a dense 3D model that is useable for performing the operation on the object, wherein performing curvature-based upsampling comprises:

determining a 3D location of a missing point in the sparse 3D point cloud using a corresponding feature visible in at least one of the plurality of images of the object; and filling the missing point in the sparse 3D point cloud by using projective geometry and a relationship between the feature visible in the at least one of the plurality of images and a location and orientation of a camera that captured the at least one image.

19. The method of claim 18, wherein filling the missing point in the sparse 3D point cloud comprises identifying at least two contiguous regions within the images that have a constant or at least continuous color and intensity.

20. The method of claim 18, further comprising:

synthesizing a 3D surface from a multiplicity of 3D points within the contiguous regions by polynomial curve fitting;

synthesizing a first set of 3D points within missing points within the synthesized 3D surface by interpolation within the synthesized 3D surface;

synthesizing a second set of 3D points within missing points adjacent the synthesized 3D surface by extrapolation from the synthesized 3D surface; and updating pixels within the sparse 3D point cloud corresponding to the first and second set of 3D points to generate the denser 3D point cloud.

* * * * *